May 5, 1953        J. R. DAVIDSON        2,637,835

TIME CYCLE CONTROLLER

Filed Dec. 8, 1951                               2 SHEETS—SHEET 1

*INVENTOR.*
JAMES R. DAVIDSON

BY D. Clyde Jones
ATTORNEY

May 5, 1953  J. R. DAVIDSON  2,637,835
TIME CYCLE CONTROLLER
Filed Dec. 8, 1951  2 SHEETS—SHEET 2

INVENTOR.
JAMES R. DAVIDSON
BY D. Clyde Jones
ATTORNEY

Patented May 5, 1953

2,637,835

UNITED STATES PATENT OFFICE 2,637,835

TIME CYCLE CONTROLLER

James R. Davidson, Rochester, N. Y., assignor to Taylor Instrument Companies, Rochester, N. Y., a corporation of New York Application December 8, 1951, Serial No. 260,751

12 Claims. (Cl. 318—443)

1

This invention relates to time cycle controllers and to timing devices.

In many industrial processes it is necessary to control the sequence and duration of a series of steps or operations involved therein. In order to effect this result, it is the practice to utilize a device known as a time cycle controller. Since the duration of the various steps or operations vary widely with different types of products, it is necessary that the controller be readily set by simple adjustments so that the process operations can be quickly changed at will. Such a controller must be reliable in operation, since the failure of the controller to establish the predetermined sequence and to measure accurately the duration of the several operations will result in defective products. Furthermore, the controller should be of simple construction so that it can be easily repaired since it is usually employed in connection with an expensive machine which is usually put out of service if the controller fails.

One purpose of the present invention is the production of a compact time cycle controller in which the number of possible control steps can be greatly increased over the number available in prior controllers of this type.

A further purpose of this invention is the production of a simple and compact time cycle controller in which the duration of each step thereof can be readily adjusted to any desired value with no effect upon the duration of any other step.

Another purpose of the invention is the production of a timing device suitable for the generation of control impulses at selectively spaced intervals.

Various features and advantages of the invention will appear from the detailed description and claims when taken with the drawings in which:

Figs. 6 and 7 are front and side elevations of a modified form of the invention while

2

Figure 1:
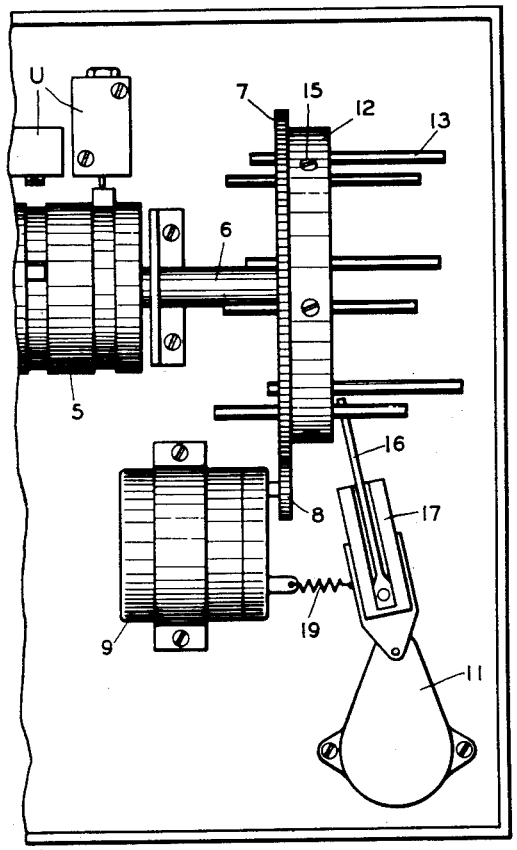
Fig. 1 is a fragmentary front elevation of the time cycle controller.

In the drawings the numeral 5 designates a cam drum or equivalent cam elements which are secured on a driven shaft 6 to actuate units U which may be electric switches or air valves. However the cam drum may be similar in construction to that disclosed in Brown et al. Patent 2,272,237 granted February 10, 1942, to actuate switching elements, as set forth in that patent. The shaft 6 is driven through the gears 7 and 8 by the intermittently operated electrical driving motor 9. The motor 9 is driven by an electric circuit to be described which circuit can be interrupted for predetermined intervals so that the cam drum can be held in a given position to measure a given time period. The electric circuit for the driving motor 9 is controlled by switching means governed jointly by indexing mechanism and by an interval measuring motor 11.

The indexing mechanism comprises an index disc 12 mounted on or driven from the shaft 6 for rotation therewith. This disc has holes therethrough located near its periphery. It will be understood that the number of holes in the index disc will correspond with the maximum number of steps to be controlled in any given cycle. The holes in the index disc, receive indexing pins 13, the number of which is determined by the number of steps in a given cycle. The index pins extend parallel to the shaft 6 and project to the right of the indexing disc 12 (Fig. 1) for a distance corresponding to a desired duration of the interrupting interval. When a given pin has been adjusted, it is locked in adjusted position by a set screw 15. An arm 16 flexibly mounted on the wall of a sensitive snap-acting switch 17 cooperates with any one of the pins 13, to determine the period that the cam shaft 16 shall remain at a given step. As long as the arm 16 is in engagement with a pin 13, the switch 17 interrupts the driving circuit of the driving motor 9, to stop this motor. At the same time, the switch 17 closes an operating circuit for the interval measuring motor 11. This motor must be of such a type that it may be rotated freely in a counter-clockwise direction when not driving in the clockwise direction, or a separate clutch must be provided to accomplish this. Under the control of this circuit, the motor 11 rotates the switch 17 and its arm 16 in a clockwise direction (Fig. 1) along a given pin 13 until this arm drops off of the end of this pin whereupon the spring 19 returns the switch to the position shown in Figs. 1 and 3. When the arm 16 drops from the end of a pin 13, the switch 17, closes the driving circuit of the motor 9, which rotates the index disc 12 in the direction of the arrow (Fig. 2) until the arm 16 contacts the succeeding pin 13. Then the switch 17 interrupts the circuit of motor 9 to stop it and also closes the circuit for the interval motor 11 which measures the new interval as determined by the adjusted length of the pin 13 now under consideration. The alternate operation of the motors 9 and 11, in the manner described, proceeds through a pre-determined cycle.

It will be understood that the timer of the present invention, can provide a large number of time steps, limited only by the number of pins 13 that can project from the index disc 12 and the interval of each step is readily predetermined by adjusting the length of the portion of its pin 13 that projects from the disc 12.

Figure 4:
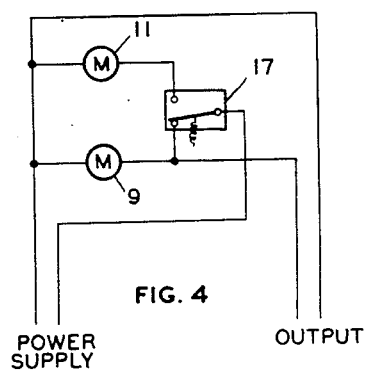

It will also be appreciated that the timer of the present invention, while specifically devised to operate in conjunction with a cam shaft or similar device for controlling a succession of operations in proper sequence, can also be used without the cam shaft to provide a succession of independently timed pulses or signals, as shown in the circuit diagram of Fig. 4. In this modified form of the invention, drum 5 and units U are omitted and a device (not shown) operated by the timer can receive its impulse over the "output" circuit from the switch 17 which operates the motors, either directly or indirectly. The modified wiring diagram of Fig. 4 is similar to that shown in Fig. 3 except that the modified arrangement shows how power connections can be made to an "output" circuit which can operate an external device or relay (not shown). In this arrangement, the output circuit will transmit a short pulse of current each time that motor 9 operates, the time between pulses being determined by the setting of the respective indexing pins.

Figures 3, 5:
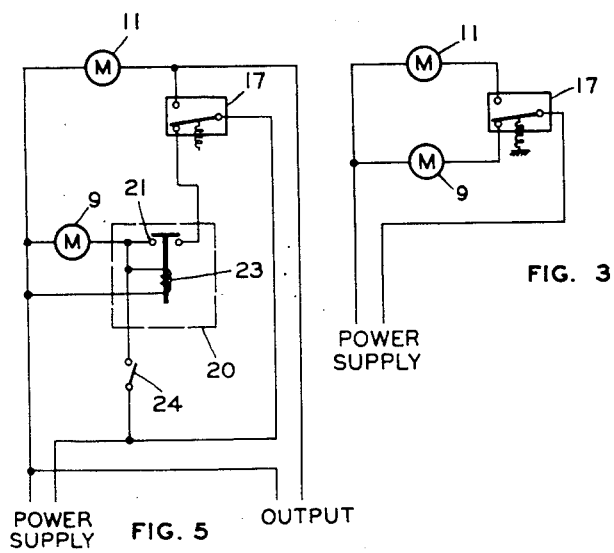
Fig. 3 is a circuit diagram illustrating how the driving motor and the interval motor are alternately operated.
Figs. 4 and 5 are diagrammatic showings of modified forms of the invention.

A further modification of the invention is illustrated in Fig. 5. Here the "output" circuit can transmit to an external device or relay (not shown) a pulse of current from the timer during the timing period determined by a given pin, at which time motor 11 is running. Provision is made here for starting each such timed pulse of current at will through a switch 24 which may be operated automatically (by means not shown) or manually. A relay 20 having an energizing coil 23, closes its contacts 21 when switch 24 is closed momentarily. Current flowing through contacts 21, operates motor 9 to drive the indexing disc and also to energize coil 23 to hold relay 20 operated. When the next pin 13 engages switch 17 this circuit is broken, motor 9 stops, relay 20 is de-energized to release contacts 21. Thus when the next timing period is completed and switch 17 returns to the position illustrated no current will flow until switch 24 is again closed.

Figure 2:
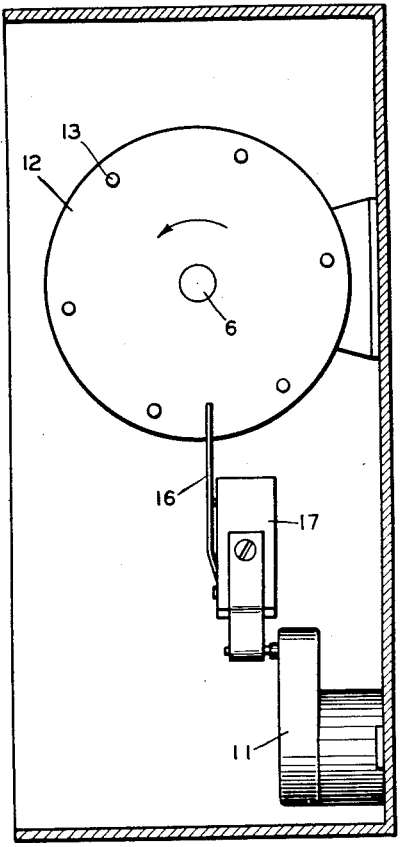
Fig. 2 is a fragmentary side elevation of the present controller with the driving motor and its gear train omitted for simplicity in disclosure.
Figure 6:
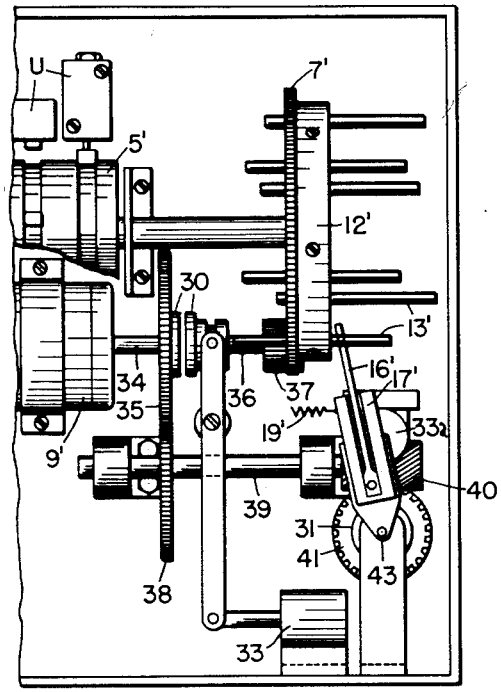
Figure 7:
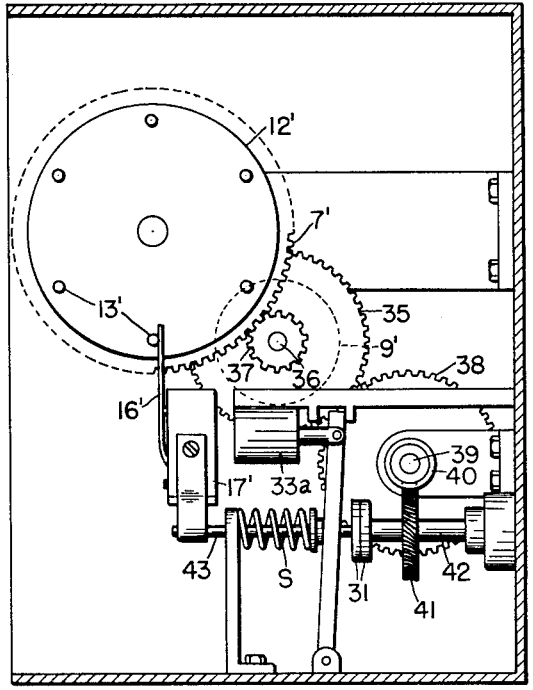
Figure 8:
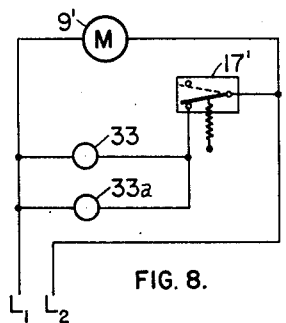
Fig. 8 is a diagram of an electrical circuit for use therewith.

A further modified form of the invention is illustrated in Figs. 6 and 7 when taken with the circuit diagram of Fig. 8. In these figures, the parts similar to those of Figs. 1 and 2 are identified by the same reference numerals but in this instance these numerals are primed. In this modification, a single synchronous motor 9 in cooperation with the direct acting clutch 30 and the reverse acting clutch 31, alternately rotates the disc 12' under the control of clutch 30 until the arm or actuator 16' of the switch 17', engages a succeeding pin 13', whereupon the clutch 30 is disengaged to stop the rotation of the disc 12', and the clutch 31 is engaged to swing the arm 16' carried on the pivoted switch 17', along the succeeding pin. The solenoid 33 is operated under the control of switch 17' to repeat these two steps.

In this modification the shaft 34 of motor 9', has mounted thereon a gear 35 and one of the plates of the clutch 30. The other plate of the clutch 30 is mounted on a shaft 36 which carries a gear 37. This gear meshes with the gear 7' to drive the disc 12'. The gear 35 meshes with a gear 38 mounted on the shaft 39. This shaft, operating through worm 40 and cooperating gear 41, drives the stub shaft 42. Shaft 42 at its left end (Fig. 7), carries one plate of clutch 31. The other plate of this clutch 31 is carried on the right end (Fig. 7) of the endwise sliding rotatable shaft 43 on which the switch 17' is mounted to swing its arm 16' along one of the pins 13'.

In the operation of this last-mentioned modification, the motor 9' is continuously rotated while the controller is in use, the motor being included in a circuit (Fig. 8) from one side L1 of the power supply to the other side L2 thereof. As shown in Fig. 7, it is assumed that the arm 16' is against a pin 13' so that the switch 17' is open as indicated by its dotted line position in Fig. 8. At this time, solenoids 33 and 33a are both deenergized. Consequently, the clutch plates 30 will be disengaged to stop the disc 12', and the clutch plates 31 will be engaged to swing the switch 17' and its arm 16' along the engaged pin 13'. When the arm drops off of the end of the engaged pin 13', the switch 17' is closed as indicated in full lines in Fig. 8. Under this condition the solenoids 33 and 33a are energized. This disengages the clutch plates 31 to stop the operation of the switch 17', and engages the clutch plates 30 to rotate the disc 12' until the succeeding pin 13' projecting therefrom is engaged by the arm 16' whereupon the switch 17' is opened to deenergize the solenoids 33 and 33a. Under this condition clutch plates 31 are engaged and clutch plates 30 are disengaged.

Figure 9:
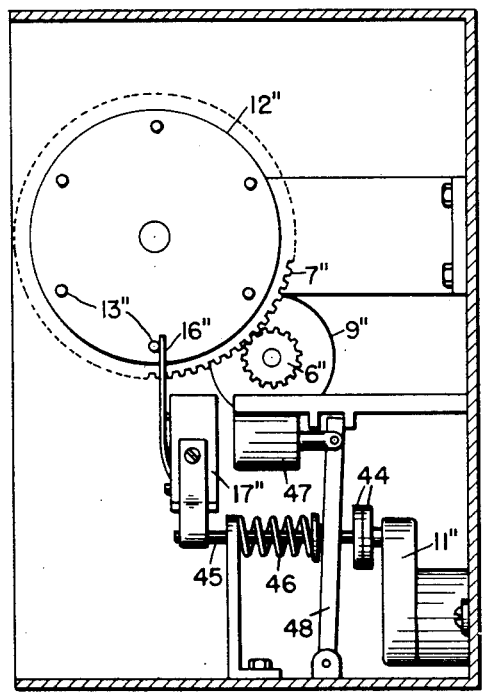
Fig. 9 illustrates a further modified form of the invention and Fig. 10 is a diagram of an electrical circuit to operate the same.
Figure 10:
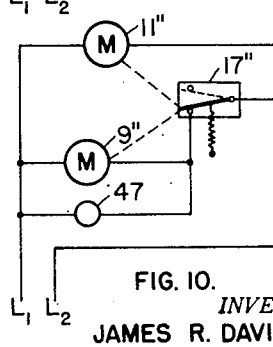

An additional modified form of the invention is illustrated in Fig. 9 when taken with the circuit diagram of Fig. 10. In this modification there is an indexing disc 12" driven by the non-synchronous motor 9" through the gears 6" and 7". The switch 17" with its arm 16" is advanced along succeeding pins 13" by means of the plates of the clutch 44 which are driven by synchronous motor 11". The switch 17" is mounted on a rotatable shaft 45 which terminates at one end in one of the clutch plates 44. The spring 46 normally holds the clutch plates 44 in engagement, while the solenoid 47 is deenergized. When, however, the solenoid is energized it swings the pivoted link 48 counter-clockwise to disengage the clutch plates 44.

During the operation of this system, the synchronous motor 11" is continuously energized from one side of the power supply L1 through the winding of the motor to the other side L2 of the power supply. Let it be assumed that the arm 16" is in engagement with one of the pins 13" so that the switch 17 will be opened to the position indicated by the broken line. At this time the circuit of the non-synchronous motor 9" and of the solenoid 47 will be open. Consequently the motor 9" will not operate and the solenoid 46 will deenergize. The spring 46 moves the link 48 of the solenoid to its normal position wherein the clutch plates 44 will be engaged. Thus the motor 11 will advance the switch 17" and its arm 16" along the engaged pin 13" until this arm drops off the end of the pin. This results in the closure of the switch 17" as shown in full lines, whereupon the solenoid 47 operates to disengage the clutch plates 44 to stop the movement of the switch 17" and at the same time the motor 9" is energized to index the disc 12" until the switch arm 16" engages a succeeding pin 13" whereupon the circuit is opened by the switch 17" to stop the motor 9" and to deenergize the solenoid 46, whereby the cycle of operation is repeated.

It will be understood that there can be other variations and modifications in the present invention, within the scope of the following claims, without departing from the spirit of the invention.

This application is a continuation-in-part of application Serial No. 193,983, filed November 3, 1950, now abandoned.

What I claim is:

1. In a timing arrangement, an output circuit, and means for completing said circuit to a source of current comprising a shaft, a driving motor for operating said shaft, a driving circuit for operating said motor, index mechanism including a member driven in synchronism with said shaft, adjustable indexing rods on said member, switching means engageable with said indexing rods in succession and including contacts movable from a normal position to an alternate position by engagement of the switching means with one of said rods, an interval motor for advancing said switching means along any given indexing rod until separated therefrom, and an operating circuit for said interval motor, said switching means alternately opening one of said driving circuits and closing the other in succession.

2. In a timing arrangement, a shaft, a driving motor for operating said shaft, a circuit for operating said motor, an index mechanism including a member mounted on said shaft for rotation therewith, spaced elongated indexing elements on said member projecting for selected distances therefrom in a direction parallel to said shaft, switching means engageable with said indexing elements in succession and including contacts operated from a normal position to an alternate position by engagement of the switching means with one of said elements, an interval motor for advancing said switching means along any given indexing element until dropped from the end thereof, an operating circuit for said interval motor, said switching means alternately opening one of said circuits and closing the other in succession.

3. In a time cycle device, a shaft, control units actuated thereby, a motor for driving said shaft, a circuit for operating said motor, index mechanism including a member driven in a given plane in synchronism with said shaft, adjustable indexing elements on said member projecting in a direction at right angles to said plane, switching means engageable with said indexing elements in succession and including contacts operated from a normal position to an alternate position by engagement of the switching means with one of said elements, an interval motor for advancing said switching means along any given indexing element until separated therefrom, and an operating circuit for said interval motor, said switching means alternately opening one of said circuits and closing the other in succession.

4. In a time cycle device, a shaft, a motor for driving said shaft, a circuit for operating said motor, an index mechanism including a disc driven in synchronism with said shaft, adjustable indexing elements on said disc and projecting at right angles to the principal plane of said disc for selected distances therefrom, switching means engageable with said indexing elements in succession and including contacts operable from a normal position to an alternate position by engagement of the switching means with one of said elements, an interval motor for advancing said switching means along any given indexing element until the switching means disengages said element, an operating circuit for said interval motor, said switching means alternately opening one of said circuits and closing the other in succession.

5. In a time cycle device, a shaft, a motor for driving said shaft, a circuit for operating said motor, an index mechanism including a member mounted on said shaft for rotation therewith, spaced indexing elements on said member projecting for selected distances therefrom in a direction parallel to said shaft, switching means engageable with said indexing elements in succession and including contacts operated from a normal position to an alternate position by engagement of the switching means with one of said elements, an interval motor for advancing said switching means along any given indexing element until dropped from the end thereof, an operating circuit for said interval motor, said switching means alternately opening one of said circuits and closing the other in succession.

6. In a time cycle device, a shaft, a motor for driving said shaft, a circuit for operating said motor, an index mechanism including a member driven in a given plane in synchronism with said shaft, indexing elements on said member projecting for selected distances at right angles to said plane, switching means engageable with said indexing elements in succession and including contacts operated from a normal position to an alternate position by engagement of the switching means with one of said elements, an interval motor for advancing said switching means along any given indexing element to a point beyond the end thereof, and an operating circuit for said interval motor, said switching means alternately opening one of said circuits and closing the other in succession.

7. In a time cycle device, a rotatable indexing disc, a first mechanism for rotating said disc, a plurality of pins of adjustable lengths mounted in spaced relation around the margin of the disc to project at right angles to the principal plane thereof, a switch having a traveling actuator adapted to engage each pin in succession and to advance along the length thereof, a second mechanism for advancing said actuator, and means controlled by said switch for operating said first and said second mechanisms alternately in succession.

8. In a time cycle device, a rotatable indexing disc, a first mechanism for rotating said disc, a plurality of pins of adjustable lengths mounted in spaced relation around the margin of the disc to project at right angles to the principal plane thereof, a switch having contacts movable from a normal position to an alternate position, a traveling actuator operatively connected to said switch and adapted to engage each pin in succession thereby moving said contacts to their alternate position, a second mechanism for advancing said actuator along an engaged pin to the end thereof, and means controlled by said switch in the respective positions of its contacts for operating said first and said second mechanism alternately in succession.

9. In a time cycle device, a rotatable indexing disc, a motor, a first clutch coupling the motor to said disc for operating the same, a plurality of pins of adjustable lengths mounted in spaced relation around the margin of the disc to project at right angles to the principal plane thereof, a switch having contacts movable from a normal position to an alternate position, a traveling actuator operatively connected to said switch and adapted to engage each pin in succession thereby moving said contacts to their alternate position, a second clutch for coupling said motor to the actuator for advancing the same along an engaged pin to the end thereof, and means controlled by said switch in the respective positions of its contacts for operating said clutches alternately in succession.

10. In a time cycle device, a rotatable indexing disc, a motor, a first clutch coupling the motor to said disc for operating the same, a plurality of pins of adjustable lengths mounted in spaced relation around the margin of the disc to project at right angles to the principal plane thereof, a switch having contacts movable from a normal position to an alternate position, a traveling actuator operatively connected to said switch and adapted to engage each pin in succession thereby moving said contacts to their alternate position, a second clutch for coupling said motor to the actuator for advancing the same along an engaged pin to the end thereof, and means including solenoids controlled by said contacts for operating said clutches alternately in succession.

11. In a time cycle device, a rotatable indexing disc, a primary motor for rotating said disc, a circuit for operating said motor, a plurality of pins of adjustable lengths mounted in spaced relation around the margin of the disc to project at right angles to the principal plane thereof, a switch having contacts movable from a normal position to an alternate position, a traveling actuator operatively connected to said switch and adapted to engage each pin in succession thereby moving said contacts to their alternate position, a second motor and a clutch coupling said second motor to said actuator for advancing the same along an engaged pin to the end thereof, and a solenoid operatively connected to said clutch for operating the same, a circuit for operating said solenoid, said circuits being controlled by said contacts.

12. In a time cycle device, a rotatable indexing disc, a first mechanism for rotating said disc, a plurality of pins of adjustable lengths mounted in spaced relation around the margin of the disc to project therefrom, a switch having a traveling actuator adapted to engage each pin in succession and to advance along the length thereof, a second mechanism for advancing said actuator, and means controlled by said switch for operating said first and said second mechanisms alternately in succession.

JAMES R. DAVIDSON.

References Cited in the file of this patent

UNITED STATES PATENTS

| Number | Name | Date |
|---|---|---|
| 1,508,770 | Blood | Sept. 16, 1924 |

FOREIGN PATENTS

| Number | Country | Date |
|---|---|---|
| 425,930 | Great Britain | Mar. 25, 1935 |